United States Patent [19]

de Leiris

[11] 4,276,340
[45] Jun. 30, 1981

[54] CELLULOSE PACKAGING FILMS FOR PACKAGING SOFT CHEESES

[75] Inventor: Jean-Pierre de Leiris, Creteil, France

[73] Assignee: La Cellophane, Paris, France

[21] Appl. No.: 52,812

[22] Filed: Jun. 27, 1979

[30] Foreign Application Priority Data

Jul. 7, 1978 [FR] France .................................. 78 20248

[51] Int. Cl.³ .................... B32B 3/00; B32B 27/14; B05D 5/00; B65B 55/00
[52] U.S. Cl. .................................. 428/166; 426/8; 426/118; 426/127; 426/130; 426/415; 427/209; 428/195; 428/207; 428/211; 428/327
[58] Field of Search ............ 426/130, 127, 8, 118, 426/415; 428/195, 211, 166, 327; 427/209

[56] References Cited

U.S. PATENT DOCUMENTS

| | | |
|---|---|---|
| 2,402,605 | 6/1940 | Cowen . |
| 2,704,268 | 3/1955 | Brown .................................. 428/166 |
| 2,882,169 | 4/1959 | Kielsmeier et al. . |
| 2,906,646 | 9/1959 | Smith et al. . |
| 2,958,620 | 11/1960 | Ono ................... 428/166 X |
| 3,223,535 | 12/1965 | Rosser ................. 427/209 X |
| 3,255,020 | 6/1966 | Ferrell ................. 426/130 |
| 3,340,089 | 9/1967 | Bougie ................ 426/130 X |
| 3,369,859 | 2/1968 | Cornelius ............. 426/130 X |
| 3,892,902 | 7/1975 | Ilukowicz ............ 428/166 X |
| 4,063,641 | 12/1977 | Kuehn et al. ......... 426/127 X |

Primary Examiner—Thomas J. Herbert, Jr.
Attorney, Agent, or Firm—Sherman & Shalloway

[57] ABSTRACT

A cellulose packaging film for packaging soft cheeses has a controlled permeability to oxygen, carbon dioxide, ammonia and water vapor which allows the cheese to properly ripen while wrapped in the packaging material. The cellulose packaging film is formed from a cellulose film substrate with a coating layer of a nitrocellulose varnish having distributed therein casein or starch particles which have a diameter which is greater than the thickness of the coating layer. In use, the soft cheese is wrapped with the cellulose packaging film with the nitrocellulose varnish layer facing the soft cheese.

10 Claims, 1 Drawing Figure

U.S. Patent
Jun. 30, 1981
4,276,340
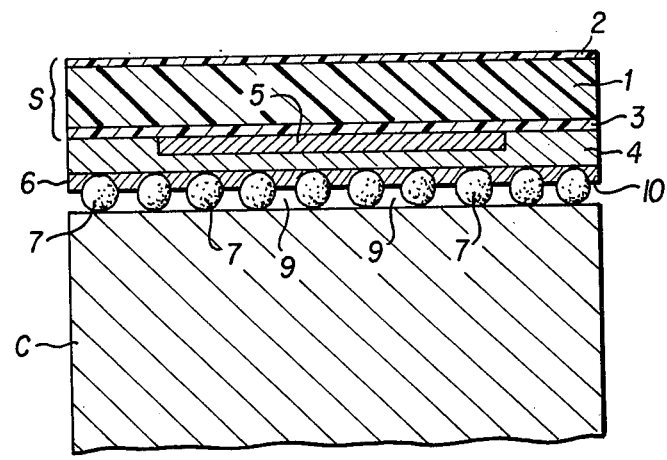

CELLULOSE PACKAGING FILMS FOR PACKAGING SOFT CHEESES

BACKGROUND OF THE INVENTION

1. Field of the Invention

This invention relates to celulose packaging material particularly adapted for packaging soft cheeses. More specifically, the subject invention relates to a cellulose film packaging material especially useful for packaging soft cheeses which have not yet fully ripened and to a process for preparing the cellulose film packaging material.

2. Discussion of the Prior Art

Soft cheeses such as Camembert, Coulommier, Brie etc., are packaged in suitable packaging material before the cheese has completely ripened. After packaging the ripening process will continue until the cheese is consumed. This can often occur as much as a month or more after packaging. Basically, the ripening process is a dynamic bacterial fermentation process during which the cheese absorbs oxygen from the atmosphere and releases carbon dioxide. It is therefore necessary that the packaging film for soft cheeses should be sufficiently permeable to oxygen and carbon dioxide to allow the ripening process to proceed smoothly and under conditions such that the cheese will be sufficiently ripened for the particular type of cheese.

Moreover, soft cheeses are characterized by having a rather high moisture content. It is therefore essential that the packaging material not only be permeable to oxygen and carbon dioxide but also be permeable to the passage of water vapor contained within the cheese product. However, while the packaging material must be sufficiently permeable to water vapor to avoid condensation of water on the surface of the cheese which would result in destruction of the bacterial molds, the permeability to water vapor must not be sufficiently high such that the cheese will dry out during the ripening process.

The various factors which effect the development of a ripened soft cheese include, for example, the initial composition of the cheese culture, e.g. quality of the milk, bacterial culture, and the like; climatic conditions during the manufacturing process; ripening conditions, e.g. temperature, humidity, etc; storage conditions; gas exchange with the ambient environment, after packaging, with, in particular, water vapor, oxygen, carbon dioxide and ammonia; and heat exchange with the ambient environment.

As noted above the packaging material for packaging soft cheeses must not be impermeable to water vapor since it would otherwise promote proteolysis which will accelerate the degradation of the bacteria resulting in an unusable product. Furthermore, if water is permitted to condense on the surface of the cheese it would promote conditions which are unfavorable to the existence of the microbial flora which imparts to the cheese its characteristic flavor and texture.

On the other hand, if the packaging material is too permeable to water vapor it will permit the surface of the cheese to dry out. This in turn results in a correlative increase in the salt content, weight loss, incomplete ripening and the appearance of pock marks or indentations on the cheese which render the cheese unacceptable to the consumer. It is therefore apparent that the gas and vapor permeability of packaging materials for soft cheeses must be carefully selected to take into account each of these factors so that a finished product of high quality can be consistently obtained. The packaging material must be sufficiently permeable to oxygen to promote the development of the surface microbial flora (e.g. *Penicillium caseicolum*) and also sufficiently permeable to the carbon dioxide and ammonia generated which inhibit the development of the surface flora.

The materials most commonly used for packaging soft cheeses are waxed paper, perforated cellulose film, or multi-layered laminates such as cellulose films/waxed paper, super coated paper/wax paper, aluminum/glassine paper/waxed paper. The double paper laminates are generally considered the most economical but the cellulose film/waxed paper laminates generally give better results with respect to the conservation, refining and appearance of the packaged product. The waxed paper is placed in contact with the cheese and permits absorption of a part of the water from the cheese and desorption through the outside cellulose film to thereby avoid surface condensation which is harmful to the Penicillium.

Uncoated cellulose film or cellulose film coated with a nitrocellulose film are sufficiently permeable to oxygen and carbon dioxide to permit ripening of soft cheeses. It is generally considered that only the nitrocellulose varnish films are sufficiently permeable to water vapor to be usable in packaging soft cheeses and therefore nitrocellulose coated films are considered to be particularly useful for this purpose. However, the commercially available nitrocellulose coated films are generally characterized by too high a water permeability. To overcome this problem it has been suggested to incorporate paraffin or other water-proofing agent into the nitrocellulose coating in an amount sufficient to lower the water vapor permeability to a degree which depends on the particular cheese.

However, while the paraffin containing nitrocellulose coatings have met with some commercial success because of their simplicity of manufacture and their low cost they are not totally satisfactory with respect to their water vapor permeability to improve the water vapor permeability, it is necessary to perforate the paraffin containing nitrocullulose water film. However, the water vapor permeability has not been uniform over the entire surface of the film and accordingly these films have been characterized by the appearance of mold rot at various random points on the surface or crust of the cheese due to the condensation of water vapor at these points.

Accordingly, it is an object of the present invention to provide a cellulose packaging film for moisture containing food products, particularly cheeses and especially soft cheeses which avoids these drawbacks and yet which is simple to prepare, economical, and comprised only of ingredients which are generally recognized as safe as packaging materials for food stuffs.

SUMMARY OF THE INVENTION

According to the present invention the problems of nonuniform water vapor permeability of nitrocellulose coated cellulose film packaging materials for soft cheeses is solved by dispersing in and throughout the nitrocellulose varnish layer particles of casein or starch, the average particle diameter of the particles being greater than the thickness of the coating layer of the nitrocellulose varnish. That is, the cellulose packaging film for soft cheeses according to the present invention is formed by coating on a cellulose film support a nitrocellulose varnish layer containing particles of casein or starch dispersed throughout the layer, the particles having a diameter greater than the thickness of the nitrocellulose layer. Accordingly, the casein or starch particles form a series of protrusions or projections from the surface of the varnish layer such that when the film is used to wrap soft cheeses with the nitrocellulose varnish layer facing the cheese the protruding particles come into intimate contact with the cheese and form a large amount of void space between the cheese crust and the packaging film. Therefore, air circulation is facilitated and, the transfer of water vapor from the surface of the cheese through the packaging material to the ambient atmosphere becomes uniform over the entire surface of the cheese crust.

The present invention will now be discussed in greater detail by the following description and the accompanying drawing in which:

BRIEF DESCRIPTION OF THE DRAWING

The FIGURE schematically illustrates a cross section of the packaging material of this invention in contact with soft cheese.

DETAILED DESCRIPTION OF THE INVENTION AND SPECIFIC EMBODIMENT

The cellulose film support can be any conventional cellulose film used in packaging soft cheeses so long as it has the requisite permeability to water vapor, oxygen, carbon dioxide and ammonia. For example, Cellophane films are particularly suitable. To assure that all of the water vapor which comes into contact with the nitrocellulose varnish layer will pass through the packaging film into the ambient atmosphere it is preferred that the cellulose film support have a permeability to water vapor which is equal to or greater than the permeability of the nitrocellulose varnish coating layer.

The preferred cellulose film support, with respect to the ease of manufacture and permeability properties is a cellulose film coated with a nitrocellulose coating. Such films are commercially available with a degree of permeability to water vapor, measured under tropical conditions by standard ASTM E 96, which is equal to or greater than 1000 $g/m^2/24$ h. However, other commercially available cellulose films having this degree of permeability, coated or uncoated, are also available and can be used as the cellulose film support. Typical of these food wrapper packaging materials are the nitrocellulose coated cellulosic wrappers described in U.S. Pat. No. 3,223,535 to Charles M. Rosser.

Although the thickness of the cellulose film support is not particularly critical it should be thick enough to have sufficient mechanical strength but yet sufficiently thin so as not to impair its permeability. Generally, thicknesses in the range of from about 25 to about 45 microns are chosen.

The nitrocellulose varnish coating layer can be formed from any conventional nitrocellulose varnish. In addition to the nitrocellulose non-toxic plasticizers mention can be made, for example, of butyl phthalate, dioctyl phthalate, epoxidized soy bean oil, polymerized rosin pentaerythritol ester, and other natural resin based plasticizers, glycerol monooleate, glycerol triacetate, etc. Ethyl acetate can be mentioned as a preferred solvent from which the nitrocellulose varnish is prepared. Other plasticizers and solvents and suitable proportions are well known in the art and are disclosed, for example, in the above mentioned patent to Rosser.

The nitrocellulose varnish layer should have a permeability to water vapor such that the permeability of the packaging film is greater than about 400 grams per square meter per 24 hour period (400 $g/m^2/24$ h) but not greater than about 1000 $g/m^2/24$ h, measured under tropical conditions by standard ASTM E 96. If the permeability of the nitrocellulose varnish is too high it is possible to incorporate paraffin or other water proofing agent in the varnish in an amount such that the permeability is lowered to obtain the optimal result for the particular type of soft cheese. Many other water proofing agents are disclosed in the Rosser patent as well as suitable proportions.

A nitrocellulose varnish layer, which may be the same or different as the nitrocellulose coating on the cellulose film support, is applied to the coated or uncoated cellulose film support. In accordance with the invention particles of casein or starch or a mixture thereof are uniformly dispersed in a solution of the nitrocellulose varnish before the varnish layer is coated on to the cellulose film support. To assure that the particles extend beyond the surface of the nitrocellulose layer the diameter of the starch or casein particles should be greater than the thickness of the nitrocellulose layer. It is not essential that all of the particles have a diameter, or major particle size dimension, which is greater than the thickness of the coating layer, but generally at least 50% of the particles, more preferably at least 80% of the particles, most preferably at least 90% of the particles and especially preferably all of the particles have a diameter which is greater than the applied thickness of the nitrocellulose varnish coating layer.

While it is preferred to disperse the starch or casein particles in the nitrocellulose varnish solution before depositing the solution on the cellulose film support it is also possible to apply the varnish layer to the cellulose film support and before drying the varnish layer to uniformly deposit, as, for example, by sprinkling, the starch or casein particles over the still wet varnish layer. The weight of the particles should be sufficient to cause the particles to penetrate through the varnish layer to the surface of the cellulose film support while at the same time extending beyond the surface of the nitrocellulose varnish layer. Or, a slight amount of pressure, as by a pressure roller can be used to cause the starch or casein particles to penetrate into the nitrocellulose varnish layer.

The casein and starch particles are of food quality and therefore are entirely safe additives to the food packaging material. In addition they have the advantage of absorbing water vapor as it evaporates from the soft cheese. As a result of this absorption the water vapor is distributed homogeneously over the entire surface of the film. Therefore, the water vapor is tranferred from the cheese to and through the packaging film in a regular manner over the entire surface of the packaging film to thereby avoid condensation of the water vapor at random points over the surface of the packaging film wherein the permeability of the packaging material to water vapor is lower than over the remaining surface area. Accordingly, the packaging material of the present invention does not disturb the development of the Penicillium and permits a good and uniform ripening of the soft cheese.

Preferably, the particles of starch or casein will be selected with an average diameter in the range of from about 5 to about 20 microns. Any form of starch, such as rice starch, wheat starch, corn starch, etc. can be used. Similarly, any form of commercially available casein can be used as the modifying particles.

Process for preparing and characterizing starch is well known from the art, eevery type of starch having a well known average diameter of particles. Starch particles have generally a spherical or approximately opherical configuration.

Process for preparing casein is well known from the art. The basis of the process is the coagulatin of milk in an acid medium, washing and drying. Casein particles are then obtained by milling and the configuration and average diameter of the particle are very different. The particles are then sifted adequately. The amount of particles in the varnish coating can vary between 2% and 10% by weight and more preferably 4% and 8% by weight and most preferably about 6% by weight.

If desired, the packaging film can be printed to provide advertising or other attractive display features to add consumer appeal. Preferably, the printed matter will be placed between the cellulose film support which may or may not be previously coated, and the nitrocellulose varnish layer containing the casein or starch particles. In this way, the printed matter is protected from outside contact by the film and from contact with the cheese by the nitrocellulose varnish layer. Most suitably, a nitrocellulose or polyamide based ink will be selected for the printed matter.

To further improve the optical quality of the printed matter a second uniform printed layer which may be white or colored and formed from such particles as silica, alumina, titanium dioxide, and similar pigments, can be placed over the first printed layer and under the nitrocellulose varnish layer.

In the figure the cellulose support film S is formed from cellulose film 1 which is coated on its front and back surfaces with nitrocellulose layers 2 and 3. Colored printing matter 5 is printed on layer 3 and uniformly covered by an opacifying layer 4 of titanium dioxide. The nitrocellulose varnish layer 6 throughout which the casein or starch particles 7 are dispersed is coated over the opacifying layer 4. The particles 7 extend beyond the exterior surface 10 of the nitrocellulose varnish layer and are in contact with the soft cheese C. Air spaces 9 are formed between successive particles 7 and provide for air circulation. Water vapor which evaporates from the soft cheese may pass directly to the nitrocellulose layer 6 or may be absorbed by the particles 7. In either case the water vapor is transmitted uniformly throughout the nitrocellulose varnish layer, printed layers and the cellulose film support and to the ambient atmosphere.

The invention will now be described by an example of a specific embodiment which should not be considered as limiting the scope of the subject invention but which is provided merely for a better understanding thereof.

EXAMPLE

On a cellulose film of an average weight of 33 g/m$^2$ coated with a 1 micron thick layer of nitrocellulose varnish (CELLOPHANE 330 LMS 50 a registered trademark of La Cellophane France) there was printed a pattern using nitrocellulose inks by heliogravure printing. The particular nitrocellulose inks are sold under the tradename Stilleto by Lorillieux International Co. (France)

After evaporation of the solvent the entire film surface was overcoated with a layer of a white titanium dioxide pigment of about 1.5 g/m$^2$/(dry matter)

The following nitrocellulose varnish solution was prepared:

| | |
|---|---|
| nitrocellulose (dry extract) | 60 g |
| butyl phthalate | 30 g |
| polymerized rosin pentaerythritol ester | 10 g |
| ethyl acetate | 400 g |

To this solution 4 grams of technical casein, of average particle diameter of 20$\mu$ a product of Prolabo Company, (France) was uniformly dispersed in a mixing apparatus.

The resulting dispersion was deposited over the layer of white pigment at a rate of about 2 g/m$^2$ The resulting packaging film had a permeability of about 600 g/m$^2$/24 h (standard ASTM E 96) under tropical conditions.

If desired the permeability can be further lowered by incorporating paraffin in the nitrocellulose varnish solution.

What is claimed is:

1. A water vapor permeable cellulose packaging film especially adapted for packaging soft cheeses which comprises
   a cellulose film support; and
   a nitrocellulose varnish layer coated on said support, said varnish layer containing particles of casein or starch dispersed throughout said layer, said particles having a diameter greater than the thickness of said varnish layer.

2. The cellulose packaging film according to claim 1 wherein the average particle diameter of the particles is between 5 and 20 microns.

3. The cellulose packaging film according to claim 1 or 2 wherein the nitrocellulose varnish coating contains a water proofing agent in an amount to obtain a water vapor permeability between 400 g/m$^2$/24 h and 1000 g/m$^2$/24 h measured under tropical conditions.

4. The cellulose packaging film according to claims 1, or 2 wherein the support has a water permeability greater than or equal to 1,000 g/m$^2$/24 h measured under tropical conditions.

5. The cellulose packaging film according to claims 1 or 2 wherein the cellulose film support is previously coated on one or both sides with a thin layer of nitrocellulose varnish.

6. The cellulose packaging film according to claims 1 or 2 which further comprises printed matter comprising a nitrocellulose ink between the support and the nitrocellulose varnish layer coating.

7. The cellulose packaging film according to claim 6 which further comprises a white or colored opaque coating overlying said printed matter and beneath said nitrocellulose varnish coating layer.

8. The cellulose packaging film according to claim 7 wherein the opaque coating comprises a titanium dioxide, silica or alumina base.

9. A process for making a cellulose packaging film intended for packaging soft cheeses comprising unwinding a coated or uncoated cellulose film support, said support having a water vapor permeability measured under tropical conditions greater than or equal to 1,000 g/m$^2$/24 h, and coating a superlayer of nitrocellulose varnish containing casein or starch particles uniformly dispersed throughout said varnish, said particles having a particle diameter which is greater than the applied thickness of said superlayer.

10. The process of claim 9 which further comprises, prior to applying said superlayer, printing with a nitrocellulose ink a pattern on said cellulose film support and coating a white or colored opaque layer on said pattern.

* * * * *